(12) United States Patent
Tanaka et al.

(10) Patent No.: US 11,268,759 B2
(45) Date of Patent: Mar. 8, 2022

(54) HOUSING DEVICE

(71) Applicant: Azbil Corporation, Chiyoda-ku (JP)

(72) Inventors: Mitsuharu Tanaka, Chiyoda-ku (JP); Hisashi Beppu, Chiyoda-ku (JP)

(73) Assignee: Azbil Corporation, Chiyoda-ku (JP)

( * ) Notice: Subject to any disclaimer, the term of this patent is extended or adjusted under 35 U.S.C. 154(b) by 331 days.

(21) Appl. No.: 16/495,675

(22) PCT Filed: Mar. 24, 2017

(86) PCT No.: PCT/JP2017/012007
§ 371 (c)(1),
(2) Date: Sep. 19, 2019

(87) PCT Pub. No.: WO2018/173253
PCT Pub. Date: Sep. 27, 2018

(65) Prior Publication Data
US 2020/0096255 A1 Mar. 26, 2020

(51) Int. Cl.
*B65G 47/66* (2006.01)
*F26B 5/06* (2006.01)
*B65G 54/00* (2006.01)
*B65G 21/20* (2006.01)
(Continued)

(52) U.S. Cl.
CPC ............ *F26B 5/06* (2013.01); *B65G 21/2072* (2013.01); *B65G 21/2036* (2013.01); *B65G 47/82* (2013.01); *B65G 2201/02* (2013.01); *F26B 25/003* (2013.01)

(58) Field of Classification Search
CPC ...... F26B 5/06; F26B 25/001; B65G 21/2072; B65G 47/66; B65G 54/00; B65G 2207/22; B65H 1/00
See application file for complete search history.

(56) References Cited

U.S. PATENT DOCUMENTS 5,129,162 A * 7/1992 Hemmersbach ....... B65G 65/00
  34/217
5,649,800 A * 7/1997 Hemmersbach ....... B65G 47/66
  198/600
(Continued)

FOREIGN PATENT DOCUMENTS

JP    7-25420 A    1/1995
JP    7-21611 U    4/1995
(Continued)

OTHER PUBLICATIONS

International Search Report dated Jun. 13, 2017 in PCT/JP2017/012007 filed Mar. 24, 2017.

*Primary Examiner* — Douglas A Hess
(74) *Attorney, Agent, or Firm* — Oblon, McClelland, Maier & Neustadt, L.L.P.

(57) ABSTRACT

An enclosure includes a furnace 1 and plates 7A to 7D arranged in the furnace 1 and used for placement of articles 5. Each of the plates 7A to 7D is movable vertically in the furnace 1. The enclosure further includes guide members 60A and 60B, each of which is disposed adjacent to a side of one plate of the plates 7A to 7D that is disposed at a loading/unloading position where the articles 5 are allowed to be loaded into or unloaded from the furnace 1. The guide members 60A and 60B guide the articles 5 and are rotatable with vertical movement of the plate.

11 Claims, 17 Drawing Sheets

(51) Int. Cl.
   *F26B 25/00*   (2006.01)
   *B65G 47/82*   (2006.01)

(56) References Cited

U.S. PATENT DOCUMENTS

| | | | | |
|---|---|---|---|---|
| 7,080,968 | B2* | 7/2006 | Blackwell | B65H 29/34 |
| | | | | 198/418.6 |
| 7,507,087 | B2* | 3/2009 | Tenzek | F27B 9/36 |
| | | | | 432/126 |
| 7,695,230 | B2* | 4/2010 | Selch | B65G 1/0435 |
| | | | | 414/180 |
| 8,197,171 | B2* | 6/2012 | Wagner | F26B 5/06 |
| | | | | 414/180 |
| 8,820,516 | B2* | 9/2014 | Christ | F26B 25/001 |
| | | | | 198/747 |
| 9,725,247 | B2* | 8/2017 | Trebbi | F26B 5/06 |
| 10,710,821 | B2* | 7/2020 | Beppu | F26B 5/044 |
| 10,906,751 | B2* | 2/2021 | Berger | B65G 47/74 |
| 11,047,620 | B2* | 6/2021 | Beutler | F26B 21/14 |
| 11,047,622 | B2* | 6/2021 | Procyshyn | F26B 25/003 |
| 2006/0263179 | A1 | 11/2006 | Selch | |

FOREIGN PATENT DOCUMENTS

| | | | |
|---|---|---|---|
| JP | 2006-518319 | A | 8/2006 |
| JP | 2008-19019 | A | 1/2008 |
| WO | WO 2004/074143 | A1 | 9/2004 |
| WO | WO 2005/121671 | A1 | 12/2005 |

\* cited by examiner

HOUSING DEVICE

TECHNICAL FIELD

The present invention relates to an enclosure.

BACKGROUND ART

A freeze-drying furnace for freeze-drying a liquid medicament in vials includes a furnace including a freeze-dryer and controlling a freeze-drying process and a plate, on which the vials are to be placed, disposed in the furnace. The furnace has an opening through which the vials can be loaded into or unloaded from the furnace. The opening is provided with a door. In the furnace, for example, a plurality of plates are spaced apart vertically. A vertically movable actuator positions any one of the plates at a level of the opening for loading/unloading the vials into/from the furnace. The inside of the furnace is cleaned and sterilized with high-temperature high-pressure steam or a cleaning liquid sprayed from, for example, nozzles arranged in the furnace.

Examples of methods of transporting the vials into the furnace include a method of placing the vials in, for example, a rectangular tray, and automatically or manually transporting the tray to the plate in the furnace and a method of feeding the vials to a conveyor and transporting the vials to the plate in the furnace through an automatic transport mechanism. For example, the automatic transport mechanism brings the vials fed from the conveyor into line, moves the vials toward the plate in the furnace, places the vials onto a bridge connecting the conveyor to the furnace to form a group of a predetermined number of vials or a group of vials to fill the plate, and automatically transports the group of vials to the plate in the furnace.

In view of the properties of the liquid medicament contained in the vials, it is desirable that the freeze-drying furnace be disposed in a high-level clean room and a minimum number of drive units, which may generate dust, be arranged inside and outside the furnace.

When the vials are placed on the plate in the furnace, the vials need to be kept from falling off sides of the plate. Furthermore, it is preferable that the vials be arranged adjacent to the middle of the plate rather than the sides and ends thereof, because the temperatures of the vials are adjusted by heat transferred from a heat medium or a refrigerant flowing through the plate during the freeze-drying process. However, since the vials have, for example, a cylindrical sectional shape, pressing a group of vials into or out of the furnace generates a force to let the group of vials spread out laterally. For arranging the vials in the rectangular tray and placing the tray onto the plate, it is preferable that devices for guiding the tray be arranged adjacent to the sides of the plate to keep the tray from protruding toward a side of the furnace.

For example, PTL 1 discloses a freeze-drying apparatus including a plurality of plates and bars, arranged on each of the plates, for preventing vials from falling from the plate. PTL 2 discloses a freeze-drying furnace including vial guide members that move to a stowed position and are received so as not to interfere with a plate or vials while the vials are not loaded into or unloaded from the furnace and that move to a deployed position and guide the rows of vials when the vials are loaded into or unloaded from the furnace.

CITATION LIST

Patent Literature

PTL 1: International Publication No. WO 2004/74143
PTL 2: International Publication No. WO 2005/121671

SUMMARY OF INVENTION

Technical Problem

In the apparatus disclosed in PTL 1, it is necessary to attach the pairs of bars, which are equal in number to the plates, to the plates. Furthermore, when a furnace in the apparatus disclosed in PTL 1 is cleaned, the bars attached to the plates may make it difficult to directly clean some areas with a cleaning liquid sprayed from nozzles. To reduce the height of the stacked plates, the bottom surface of each plate can have recesses to receive the bars. However, it may be difficult to clean the recesses. In addition, the attachment of the bars to each plate may result in an increase in cost because many plates, for example, 20 plates, can be used in some cases.

In PTL 2, how to drive the vial guide members is not described in detail. To maintain a clean environment in the furnace, an actuator for driving the vial guide members needs to be isolated from the inside of the furnace so that dust generated from the actuator for driving the vial guide members is prevented from entering the furnace. This isolation requires a mechanism for coupling the actuator to the vial guide members and a sliding mechanism. This may result in complexity of the mechanisms and make it difficult to clean the inside of the furnace. Furthermore, placement of the actuator outside the furnace may adversely affect the airtightness of the furnace. In a case where the actuator is placed inside the furnace, the actuator needs to be stringently sealed to prevent dust generation.

Not only a freeze-drying furnace for vials containing medicine but also an enclosure including a furnace for storing articles are required to achieve ease of cleaning of the inside of the furnace and reduce or eliminate dust generation in the furnace. An object of the present invention is, therefore, to provide an enclosure that includes a guide member, achieves ease of cleaning of the inside of a furnace, and can reduce or eliminate dust generation in the furnace with no complex mechanism.

Solution to Problem

An aspect of the present invention provides an enclosure including a furnace and a plurality of plates arranged in the furnace and used for placement of an article. Each of the plates is movable vertically in the furnace. The enclosure further includes a guide member disposed adjacent to a side of one plate of the plates that is disposed at a loading/unloading position where the article is allowed to be loaded into or unloaded from the furnace. The guide member guides the article and is rotatable with vertical movement of the plate. According to this aspect of the present invention, movement of the article can be guided by the guide member, which moves in concert with vertical movement of the plate, without using an actuator. The guide member can guide movement of the article on the plate disposed at the loading/unloading position without interfering with vertical movement of the plate.

In the above-described enclosure, the guide member may include a contact portion capable of contacting the plate. As the plate moves vertically, the plate may contact the contact portion and the guide member may rotate.

In the above-described enclosure, the guide member may rotate about an axis located outside the side of the plate.

In the above-described enclosure, the guide member may have a center of gravity located below the axis of rotation of the guide member.

In the above-described enclosure, the plate disposed at the loading/unloading position may contact the guide member to prevent the guide member from rotating, thereby stabilizing the posture of the guide member.

The above-described enclosure may further include an external bridge disposed outside a door of the furnace and an article transfer device configured to move the article on the external bridge and the plate. The article transfer device may include a transfer unit that transfers the article in response to receiving a force and a transmission unit that is disposed on the external bridge and in the furnace and transmits a force to the transfer unit.

In the above-described enclosure, the guide member may include a rotary shaft held by a fastening member included in the article transfer device.

The above-described enclosure may further include a sterilizer that sterilizes the inside of the furnace. The sterilizer may pressurize the inside of the furnace. The sterilizer may heat the inside of the furnace.

In the above-described enclosure, the furnace may be a freeze-drying furnace.

In the above-described enclosure, the article may be a vial. The article may contain medicine.

Advantageous Effects of Invention

The present invention can provide an enclosure that includes a guide member, achieves ease of cleaning of the inside of a furnace, and can reduce or eliminate dust generation in the furnace with no complex mechanism.

DESCRIPTION OF EMBODIMENTS

Figure 1:
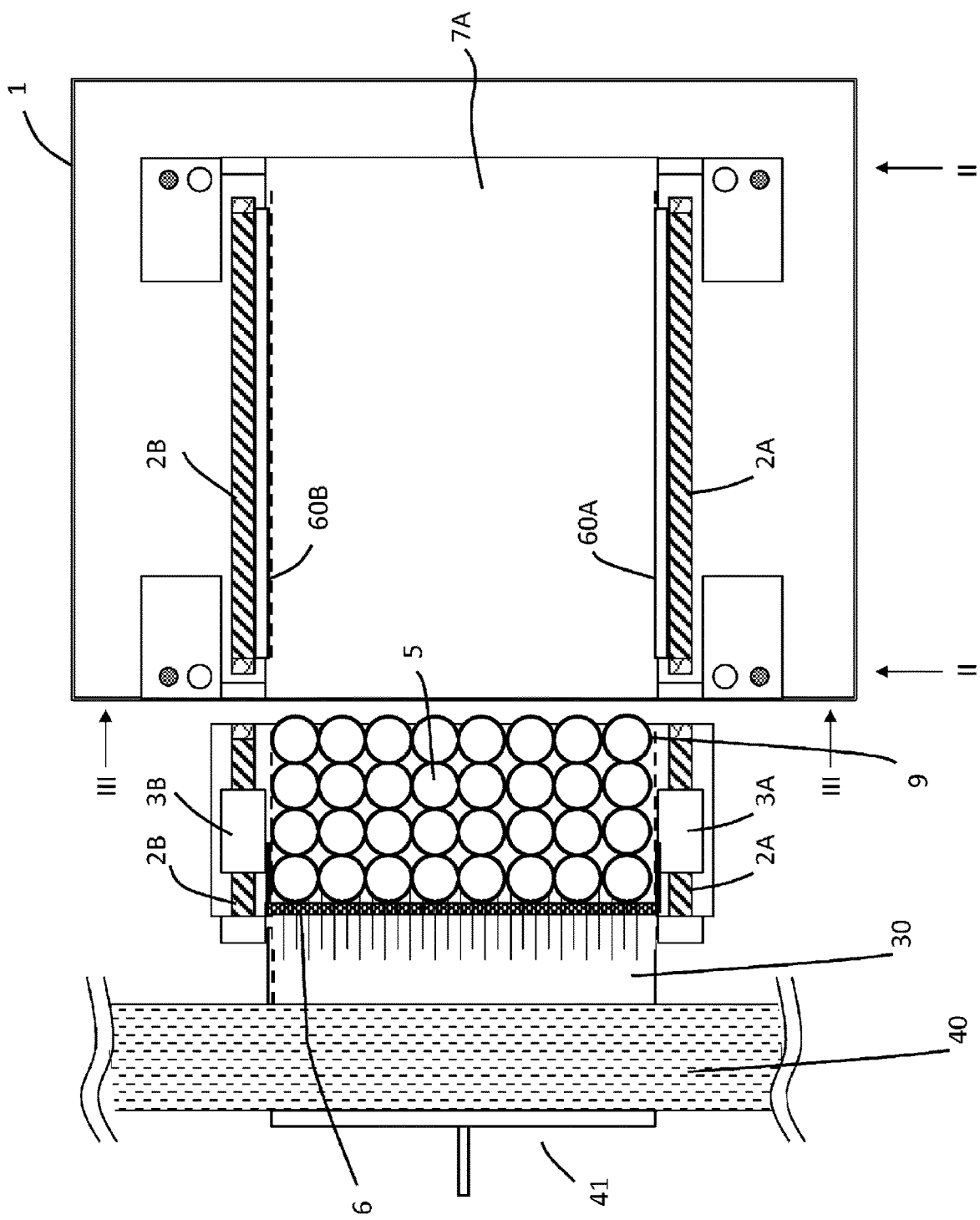
FIG. 1 is a schematic plan view of an enclosure according to an embodiment.

Embodiments of the present invention will be described below. In the drawings, which will be described later, the same or similar reference signs represent the same or similar components. Note that the drawings are schematic. For example, specific dimensions should be determined with reference to the following description. It will be appreciated that the dimensions and relative sizes of the components may differ between the drawings.

Figure 2:
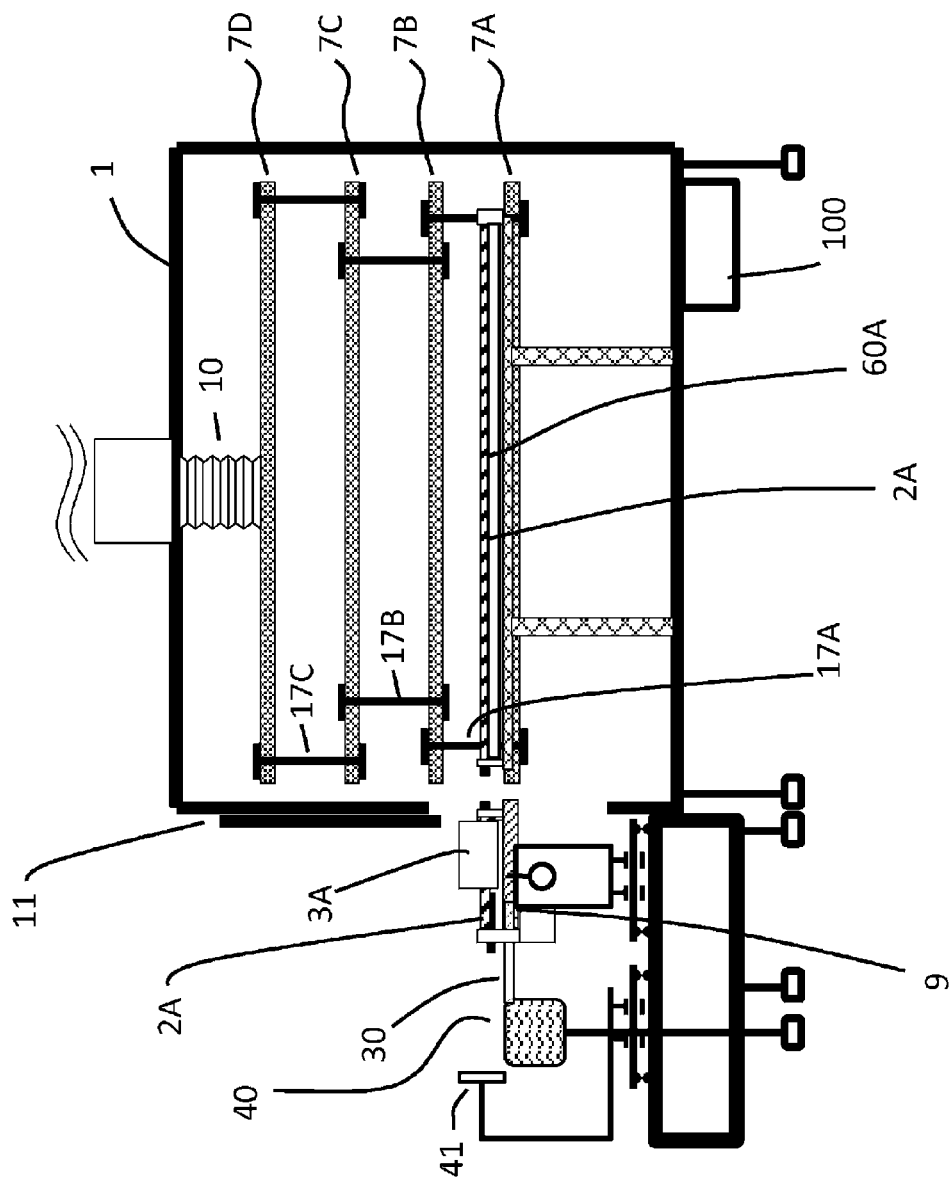
FIG. 2 is a schematic side view of the enclosure according to the embodiment viewed in II-II direction in FIG. 1.
Figure 3:
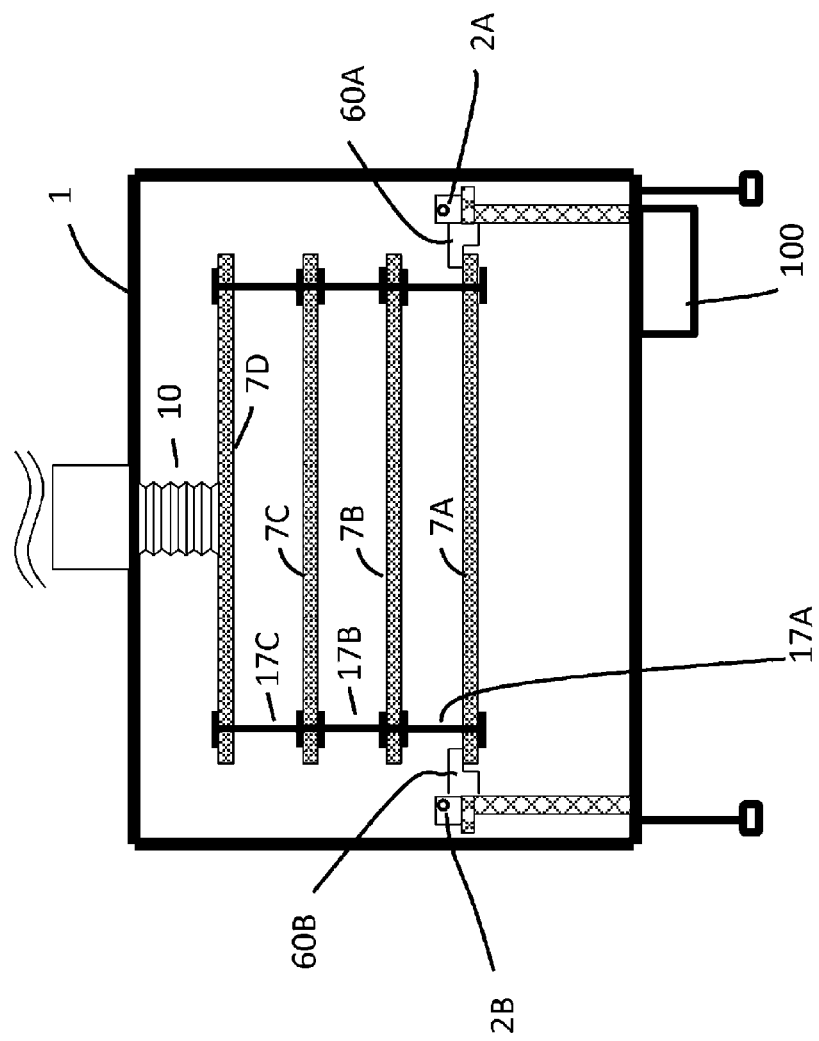
FIG. 3 is a schematic side view of the enclosure according to the embodiment viewed in direction in FIG. 1.

As illustrated in FIGS. 1, 2, and 3, an enclosure according to an embodiment includes a furnace 1 and plates 7A to 7D arranged in the furnace 1 and used for placement of articles 5. Each of the plates 7A to 7D is movable vertically in the furnace 1. The enclosure further includes guide members 60A and 60B, each of which is located adjacent to a side of one of the plates 7A to 7D that is disposed at a loading/unloading position where the articles 5 are allowed to be loaded into or unloaded from the furnace 1. The guide members 60A and 60B prevent the articles 5 from falling off the sides, guide movement of the articles, and are rotatable with vertical movement of the plate.

The enclosure further includes an external bridge 9 disposed outside a door 11 of the furnace 1 and a sterilizer 100, illustrated in FIG. 2, for sterilizing the inside of the furnace 1.

As illustrated in FIG. 1, the furnace 1 to receive the articles 5 is, for example, a temperature-controlled furnace having a temperature-controlled space. The temperature-controlled furnace may be, for example, a freeze-drying furnace. The articles 5 are, for example, vials containing medicine. Assuming that the furnace 1 is a freeze-drying furnace, the articles 5 are placed on at least one of the plates 7A to 7D in the furnace 1 illustrated in FIG. 2 and a substance, such as medicine, in the articles 5 is freeze-dried.

In the furnace 1, the plates 7B, 7C, and 7D are arranged above the plate 7A. The number of plates is not limited as long as it is two or more. The plate 7D is suspended from the ceiling of the furnace 1 by a vertical drive unit, such as an actuator, including a cylinder covered with a bellows cover 10. The plate 7C is suspended from the plate 7D by hooks 17C. The plate 7B is suspended from the plate 7C by hooks 17B. The plate 7A is suspended from the plate 7B by hooks 17A.

Figure 4:
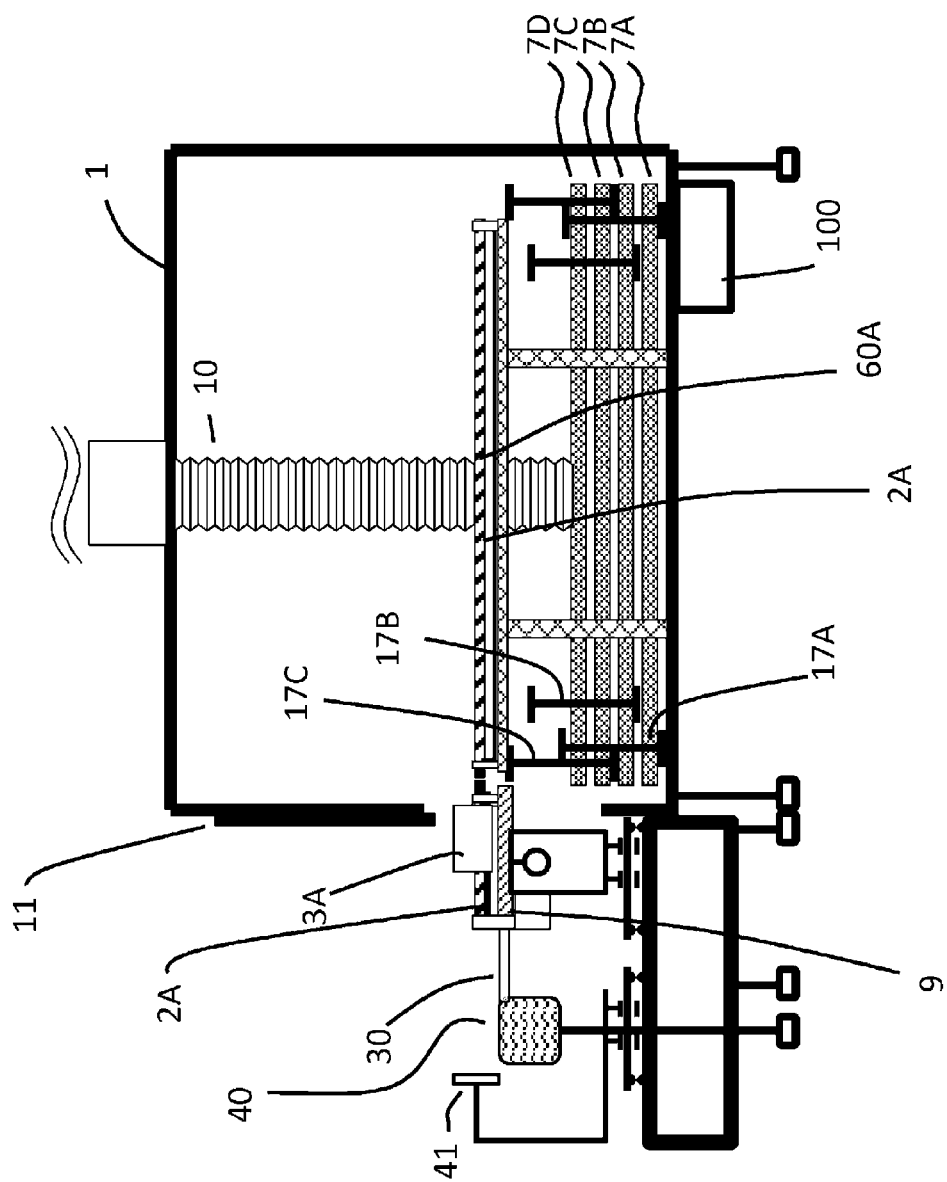
FIG. 4 is a schematic side view of the enclosure according to the embodiment.
Figure 5:
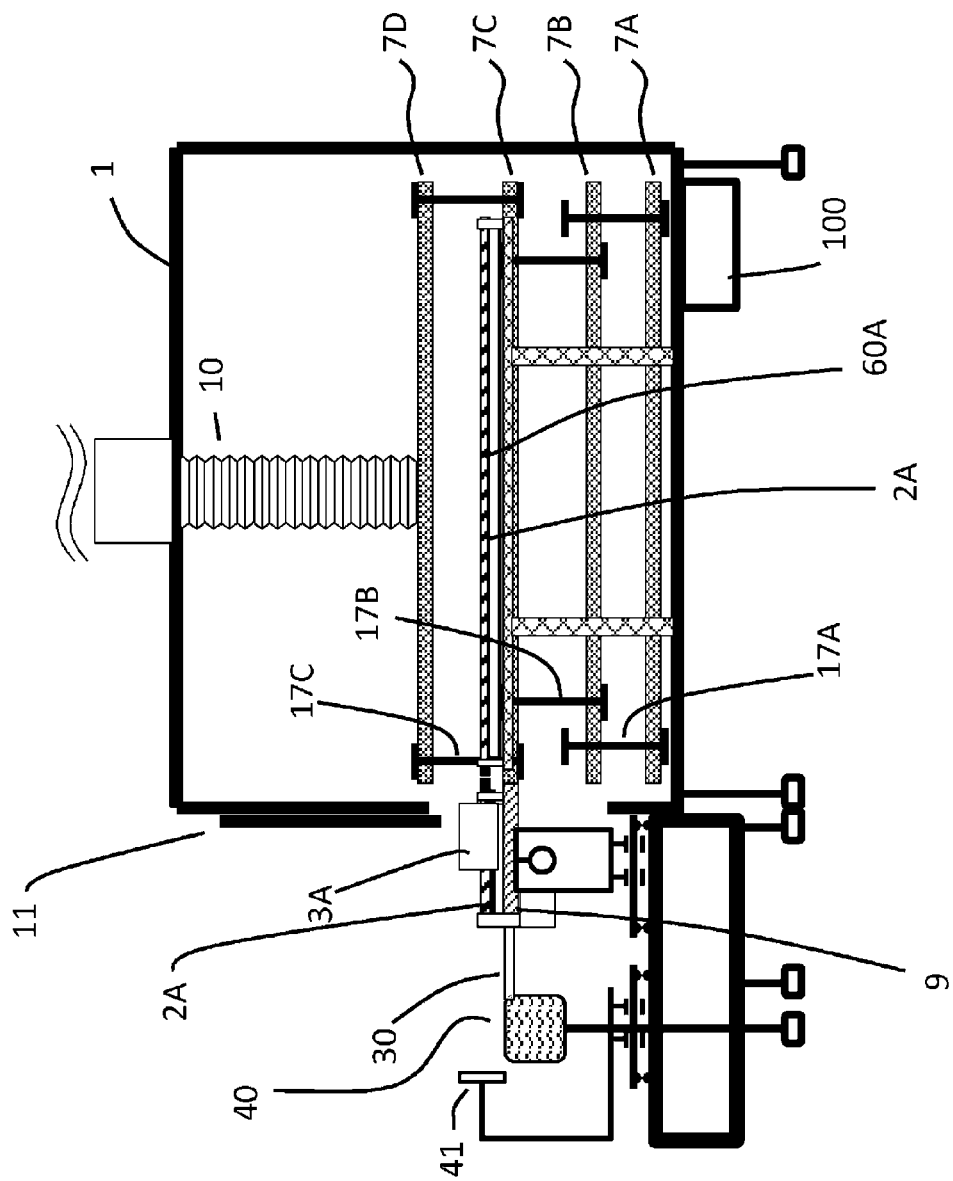
FIG. 5 is a schematic side view of the enclosure according to the embodiment.

For example, while the furnace 1 is not used, as illustrated in FIG. 4, the cylinder covered with the bellows cover 10 may extend to receive the plates 7A, 7B, 7C, and 7D in lower part of the furnace 1. To place the articles 5 on the plate 7C, as illustrated in FIG. 5, the cylinder covered with the bellows cover 10 suspends the plates 7A, 7B, 7C, and 7D such that a surface of the plate 7C is flush with a surface of the external bridge 9.

Figure 6:
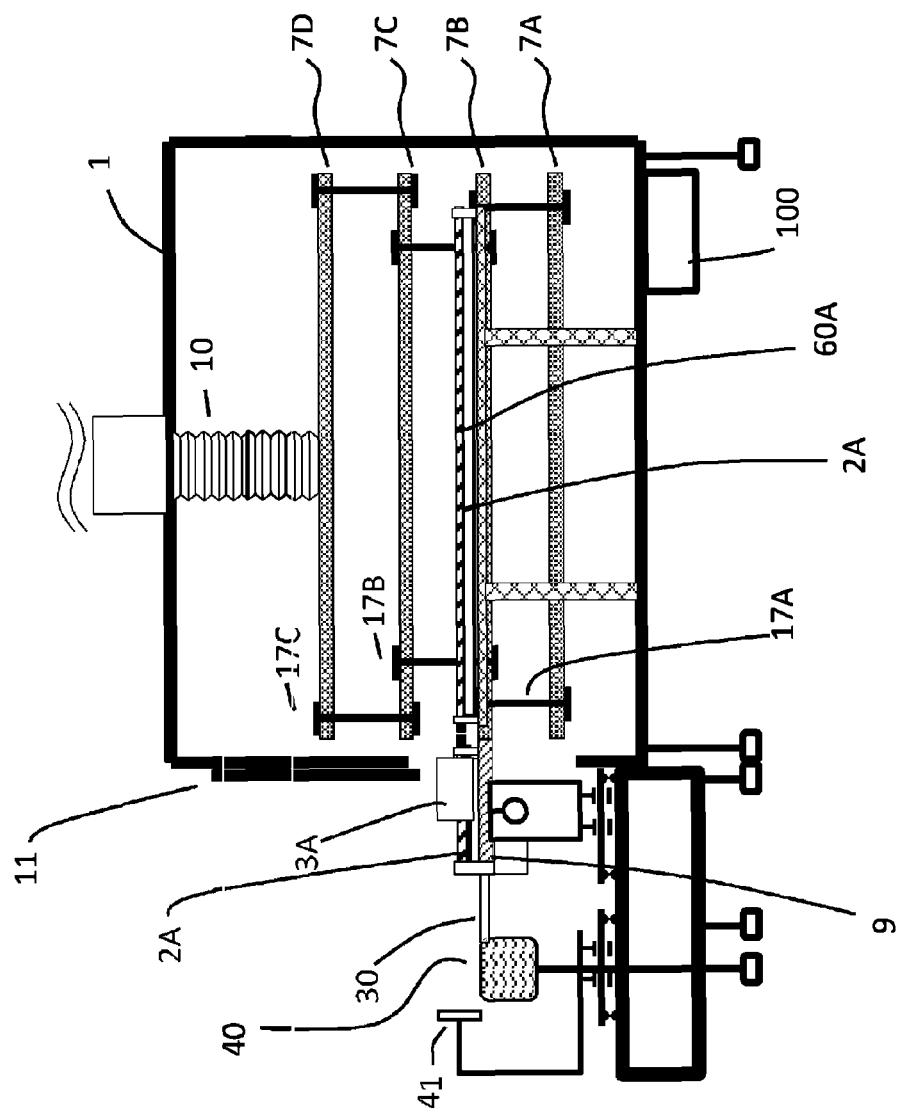
FIG. 6 is a schematic side view of the enclosure according to the embodiment.
Figure 7:
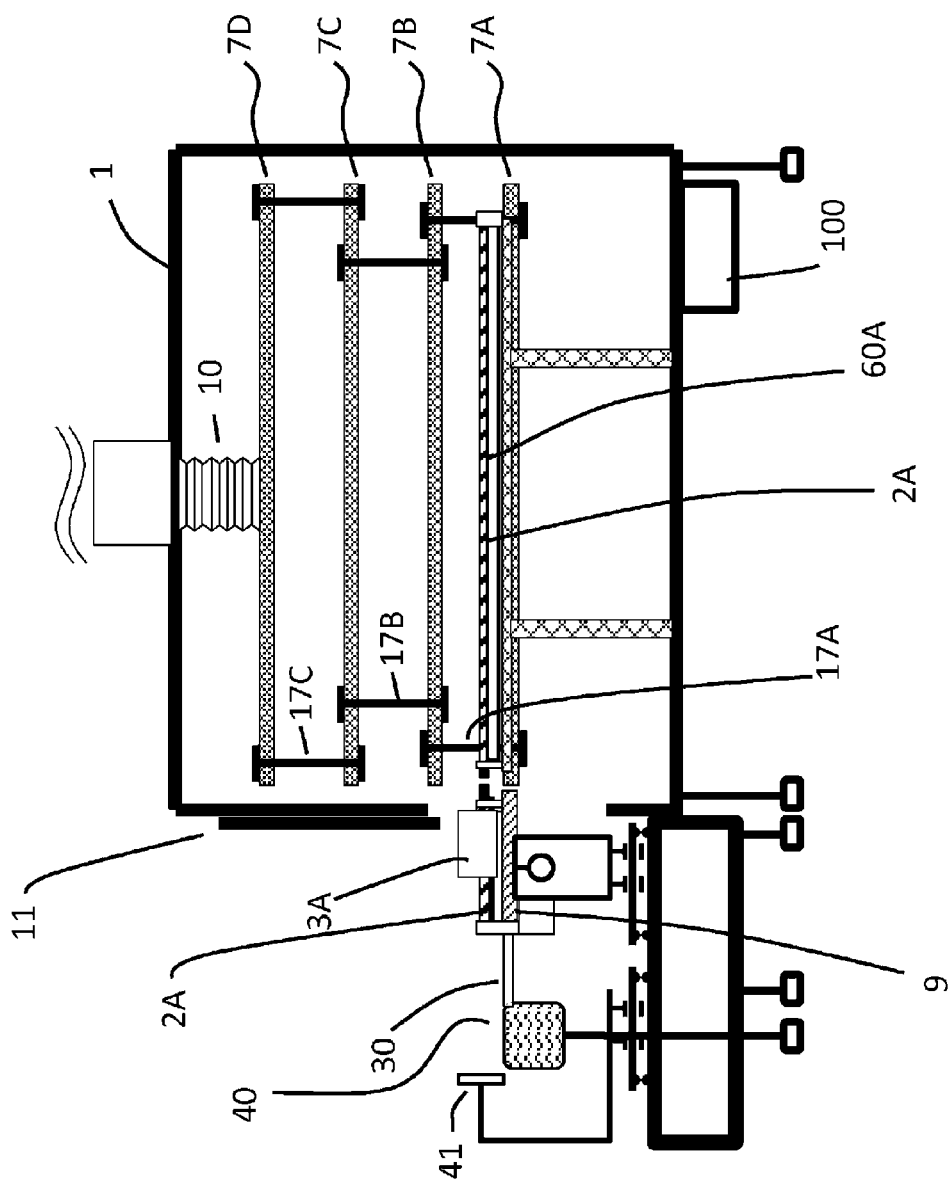
FIG. 7 is a schematic side view of the enclosure according to the embodiment.

To place the articles 5 on the plate 7B, as illustrated in FIG. 6, the cylinder covered with the bellows cover 10 suspends the plates 7A, 7B, 7C, and 7D such that a surface of the plate 7B is flush with the surface of the external bridge 9. To place the articles 5 on the plate 7A, as illustrated in FIG. 7, the cylinder covered with the bellows cover 10 suspends the plates 7A, 7B, 7C, and 7D such that a surface of the plate 7A is flush with the surface of the external bridge 9. At this time, the plates 7A to 7D are spaced apart from each other so that the articles 5 can be arranged.

The sterilizer 100 pressurizes or heats the inside of the furnace 1 to sterilize the inside of the furnace 1. The sterilizer 100 may sterilize the inside of the furnace 1 by using any method. For example, high pressure steam sterilization, dry heat sterilization, ethylene oxide gas sterilization, radiation sterilization, or ultraviolet sterilization may be used to sterilize the inside of the furnace 1. In the use of high pressure steam sterilization, a plurality of nozzles for spraying high-temperature high-pressure steam or a cleaning liquid into the furnace are arranged in the furnace 1.

Figure 8:
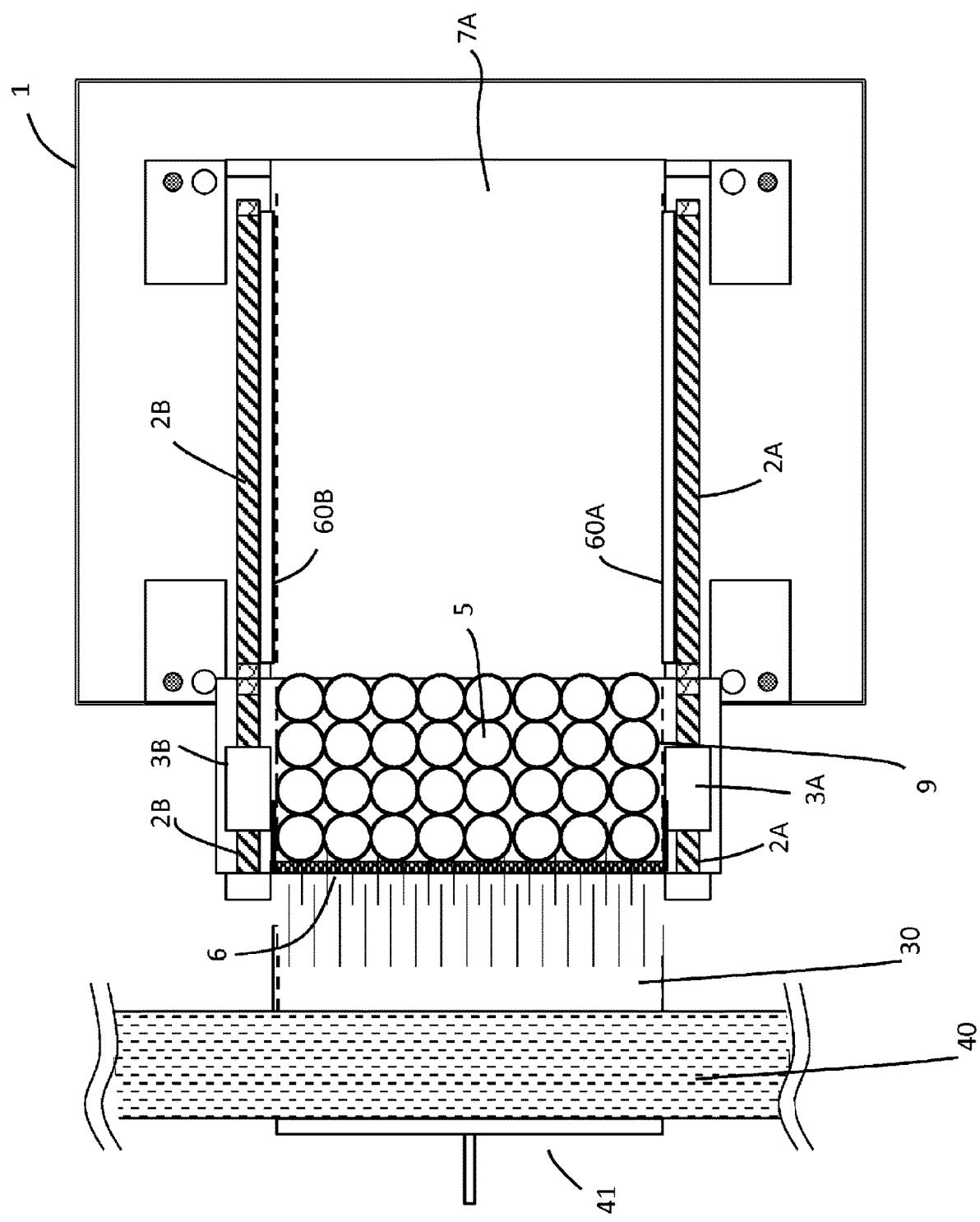
FIG. 8 is a schematic plan view of the enclosure according to the embodiment.
Figure 9:
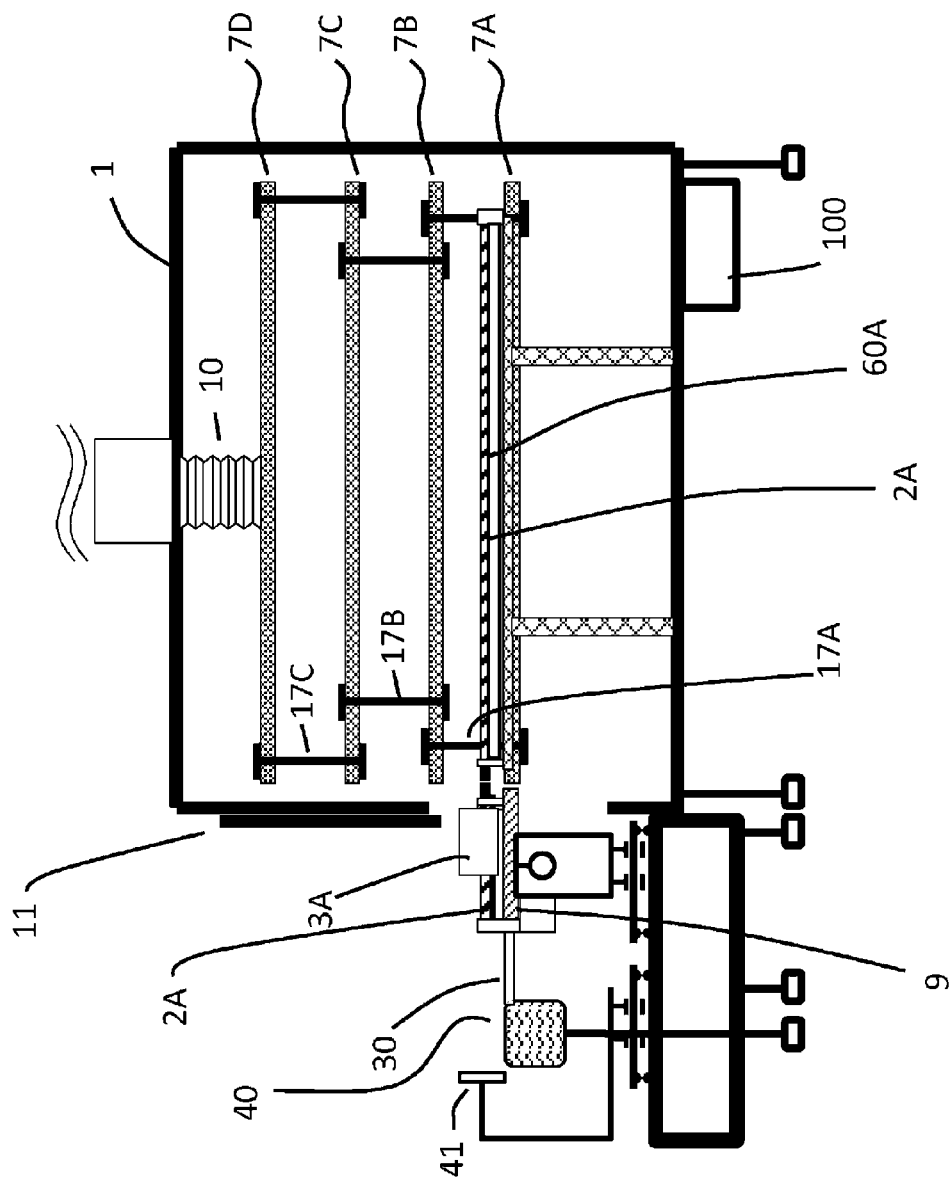
FIG. 9 is a schematic side view of the enclosure according to the embodiment.

As illustrated in FIGS. 7, 8, and 9, the external bridge 9, which is located outside the furnace 1, is movable parallel to the furnace 1 in directions closer to and away from the furnace 1. For example, the external bridge 9 approaches the plate 7A disposed at the loading/unloading position and contacts the plate 7A. The term "contacting" as used herein refers to being positioned such that the articles 5 can be slid from the surface of the external bridge 9 to the surface of the plate 7A. The external bridge 9 may be spaced apart from the plate 7A by a distance that is small enough to keep the articles 5 from falling.

A conveyor 40 is disposed on a side of the external bridge 9 remote from the furnace 1 and a stationary plate 30 is disposed between the conveyor 40 and the external bridge 9. The conveyor 40 conveys the articles 5 to be processed in the furnace 1. The conveyor 40 also conveys the articles 5 processed in the furnace 1.

The conveyor 40 is provided with a shifter 41 for shifting the articles 5 on the conveyor 40 toward the furnace 1 on a row-by-row basis.

The enclosure according to the embodiment further includes an article transfer device for moving the articles 5 on the external bridge 9 and the plate disposed at the loading/unloading position. The article transfer device includes transfer units 3A and 3B to transfer the articles in response to receiving a force and transmission units 2A and 2B, arranged on the external bridge 9 and in the furnace 1, to transmit a force to the transfer units 3A and 3B. The transmission units 2A and 2B are arranged parallel to each other along the external bridge 9 and the plate disposed at the loading/unloading position. The transfer units 3A and 3B synchronously move along the external bridge 9 and the plate disposed at the loading/unloading position. The transmission units 2A and 2B are, for example, magnetic screws, and are rotated by a drive unit, such as a motor, disposed outside the furnace 1. In this case, the transfer units 3A and 3B move in response to receiving a magnetic force from the transmission units 2A and 2B. A moving direction in which the transfer units 3A and 3B move may be defined by guide rails.

Figure 10:
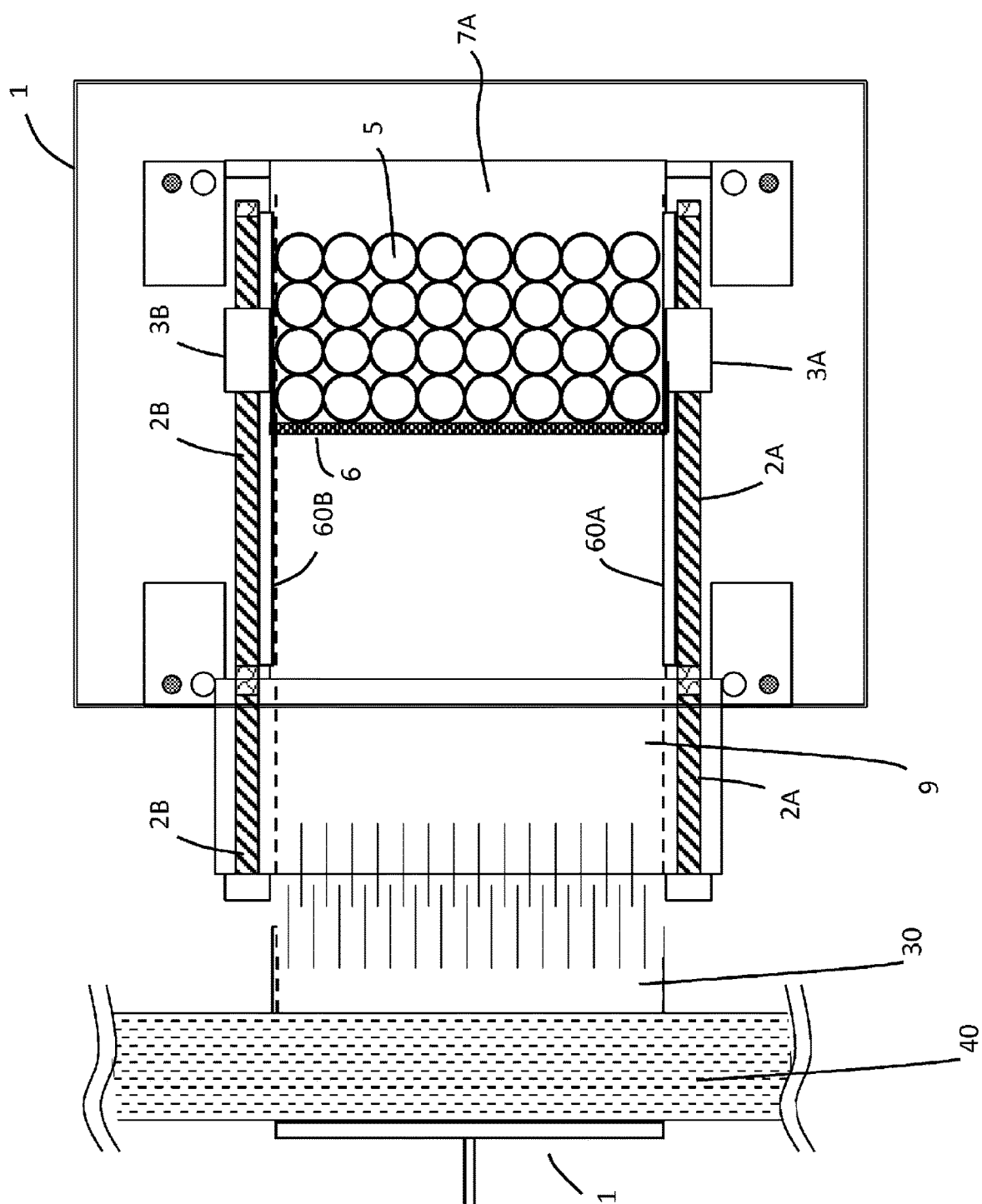
FIG. 10 is a schematic plan view of the enclosure according to the embodiment.

As illustrated in FIGS. 1, 8, and 10, a contact member 6, which can contact the articles 5, for transferring the articles 5 into or out of the furnace 1 is connected between the transfer units 3A and 3B. The contact member 6 moves with movement of the transfer units 3A and 3B and presses the articles 5 on the external bridge 9 to the plate 7A disposed at the loading/unloading position in the furnace 1. Furthermore, the contact member 6 moves the articles 5 on the plate 7A in the furnace 1 to the external bridge 9. At this time, movement of the articles 5 is guided by the guide members 60A and 60B located adjacent to the opposite sides of the plate 7A and arranged parallel to the moving direction of the transfer units 3A and 3B, thus preventing the articles 5 from falling off the opposite sides of the plate 7A. In addition, the guide members 60A and 60B allow the articles 5 to be inwardly arranged at a predetermined distance from each of the opposite sides of the plate.

Figure 11:
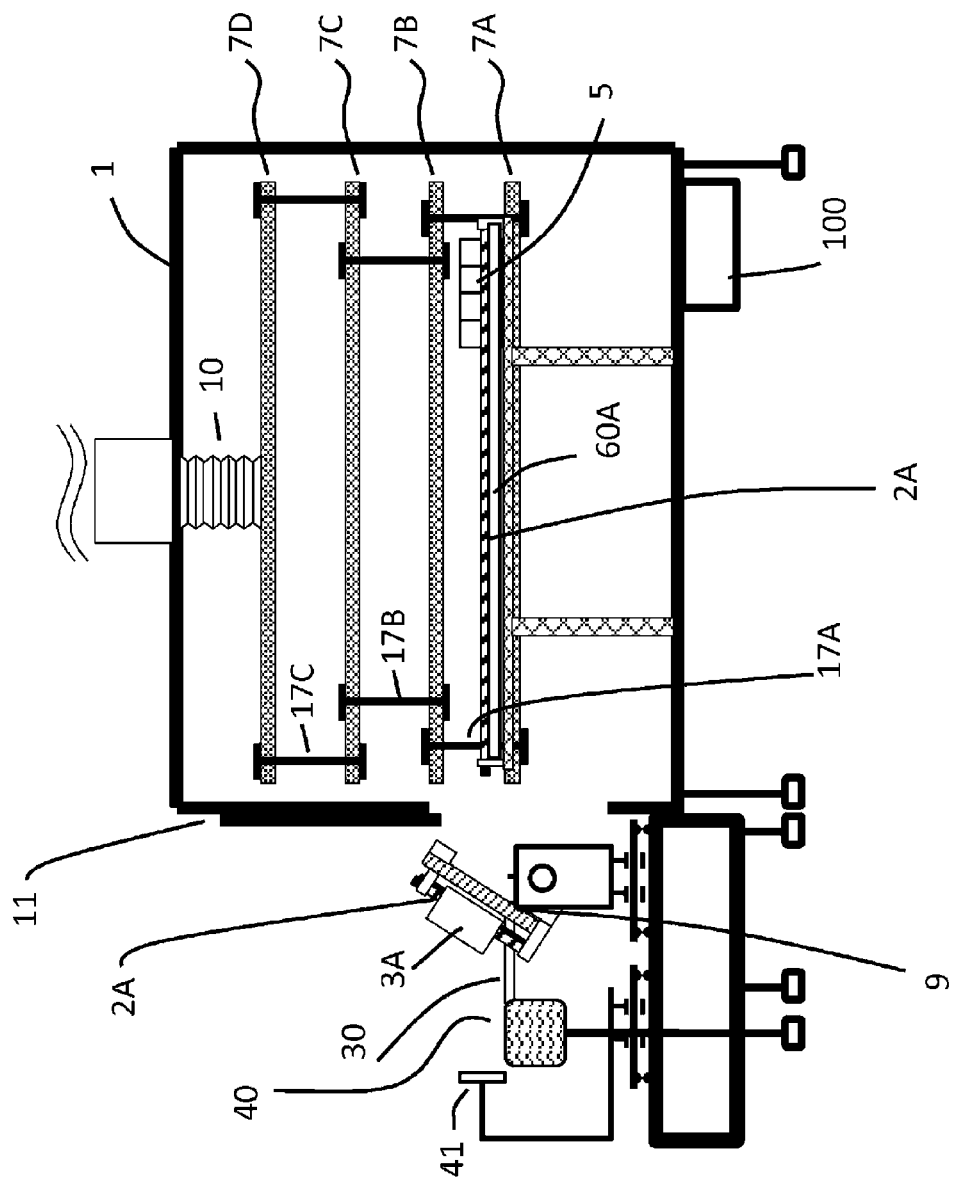
FIG. 11 is a schematic side view of the enclosure according to the embodiment.
Figure 12:
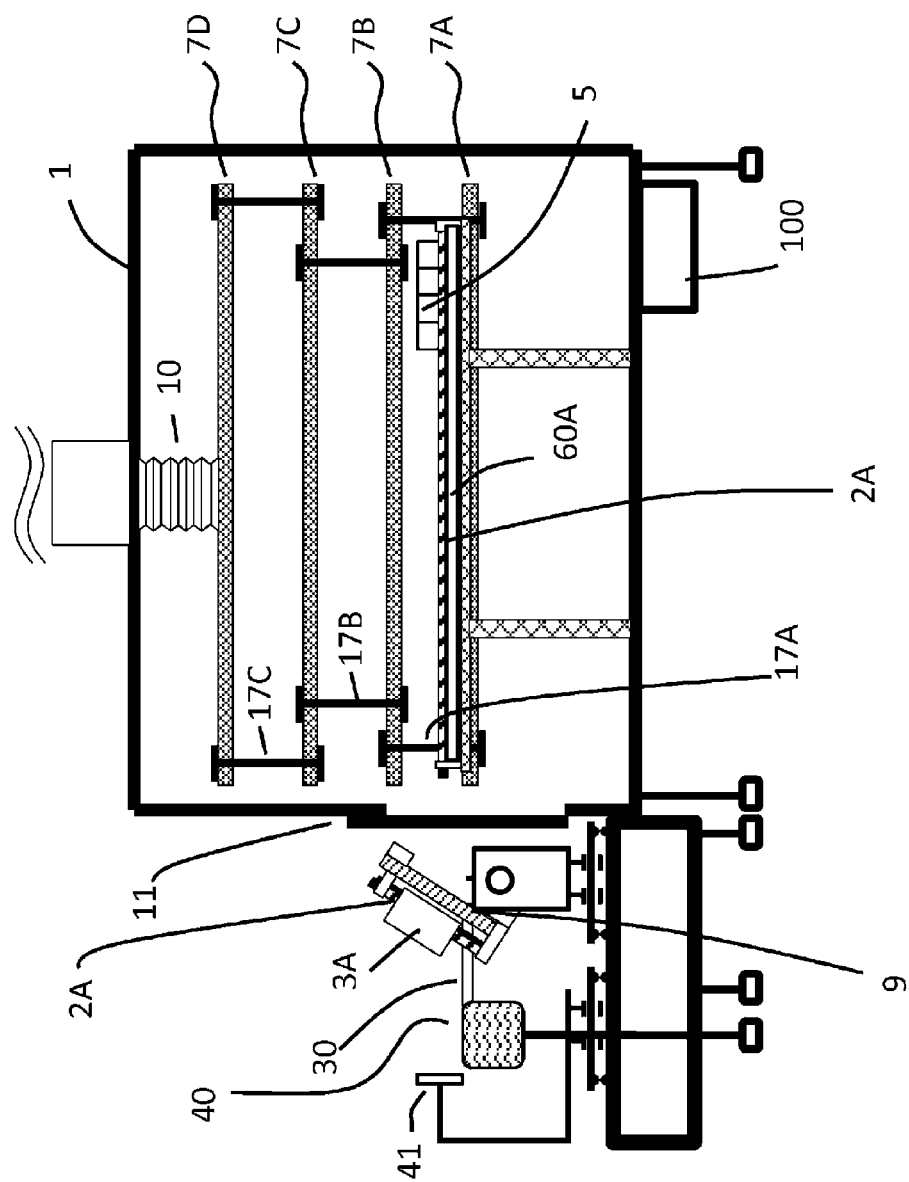
FIG. 12 is a schematic side view of the enclosure according to the embodiment.

For example, to freeze-dry the substance in the articles 5, as illustrated in FIG. 11, the transfer unit 3A moves onto the external bridge 9 while the articles 5 are left on the plate 7A in the furnace 1. As illustrated in FIG. 12, after the door 11 is closed, the substance in the articles 5 is freeze-dried in the furnace 1.

Figure 13:
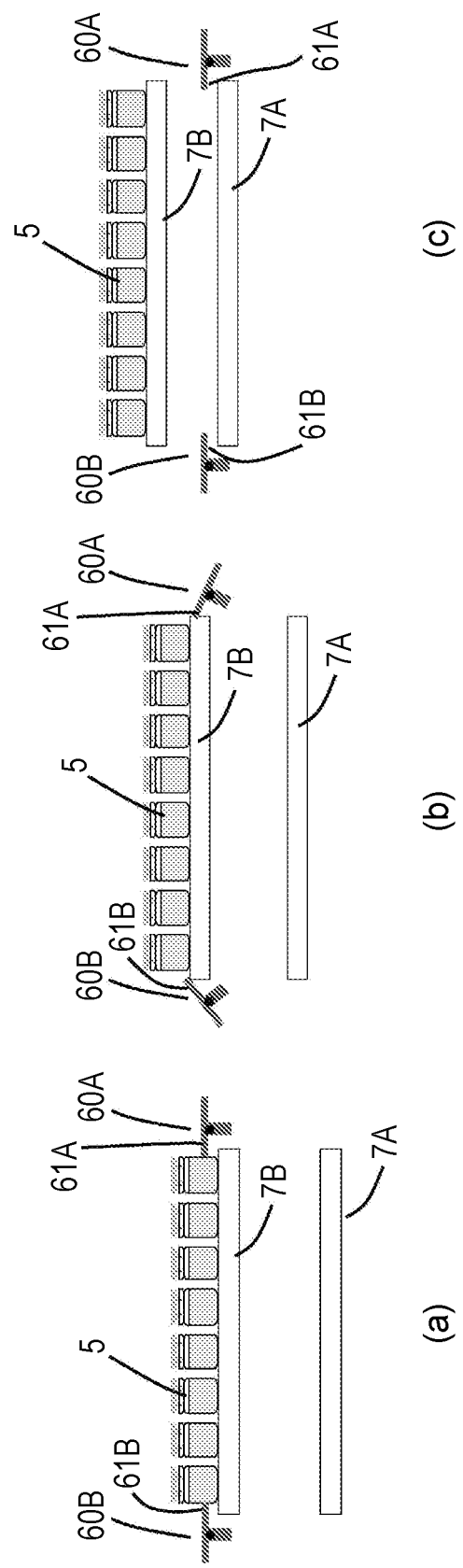
FIG. 13 includes schematic diagrams illustrating rotation of guide members in the embodiment.
Figure 14:
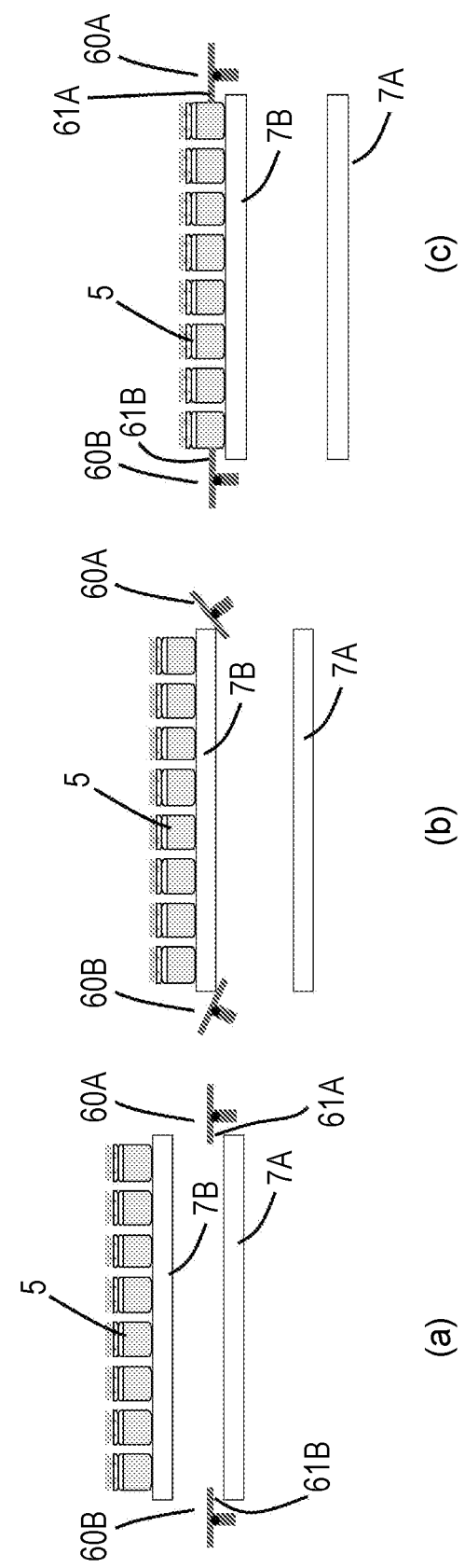
FIG. 14 includes schematic diagrams illustrating rotation of the guide members in the embodiment.

As the plate 7B disposed at the loading/unloading position, as illustrated in FIG. 13(a), is lifted as illustrated in FIGS. 13(b) and 13(c), the guide members 60A and 60B contact the plate 7B and are pressed upward and then rotate. Furthermore, as the plate 7B disposed above the loading/unloading position, as illustrated in FIG. 14(a), is lowered to the loading/unloading position as illustrated in FIGS. 14(b) and 14(c), the guide members 60A and 60B contact the plate 7B and are pressed downward and then rotate.

Figure 15:
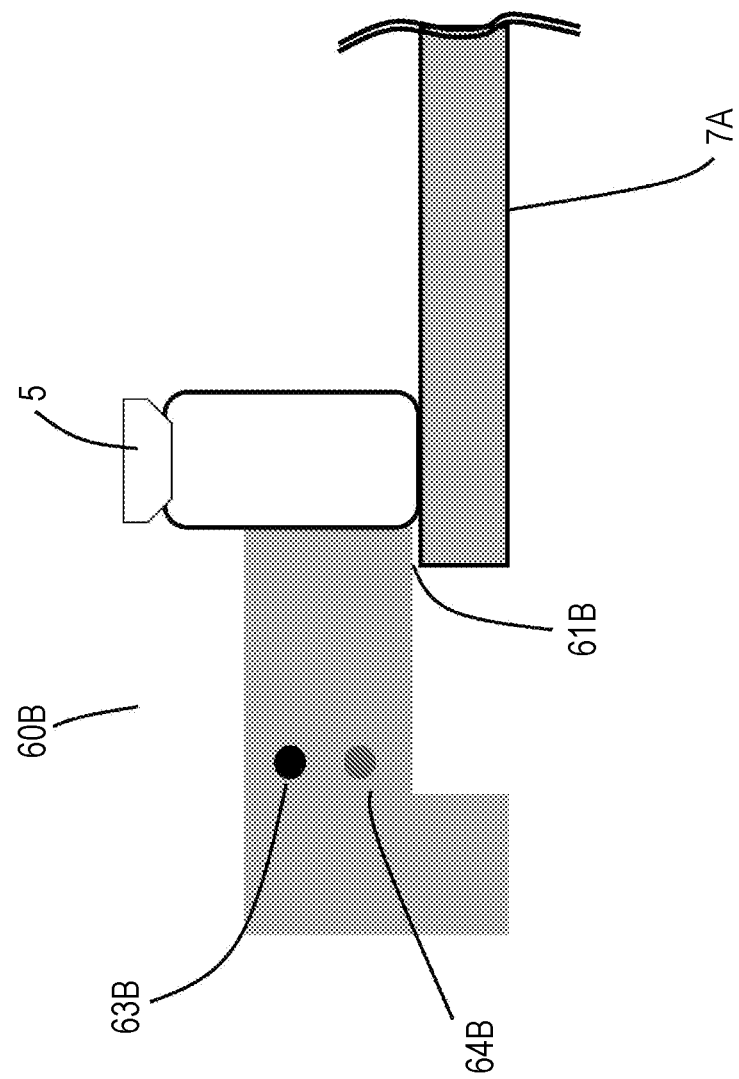
FIG. 15 is a schematic diagram illustrating the guide member in the embodiment.

As described above, the guide members 60A and 60B respectively include contact portions 61A and 61B to contact the plates 7A to 7D. As the plates 7A to 7D move vertically, the contact portions 61A and 61B contact any of the plates 7A to 7D, so that the guide members 60A and 60B rotate. As illustrated in FIG. 15, the axis of rotation, or rotation axis 63B, of the guide member 60B is located outside the side of the plate disposed at the loading/unloading position. This arrangement prevents the guide member 60B from interfering with vertical movement of the plates 7A to 7D. For example, the center of gravity, or gravity center 64B, of the guide member 60B is located below the rotation axis 63B in the direction of gravity. This arrangement enables the guide member 60B to be substantially balanced in a posture for supporting the articles 5 if the guide member 60B is not in contact with the plate. The guide member 60B includes a rotary shaft coinciding with the rotation axis 63B and extending parallel to the side of the plate.

Figure 16:
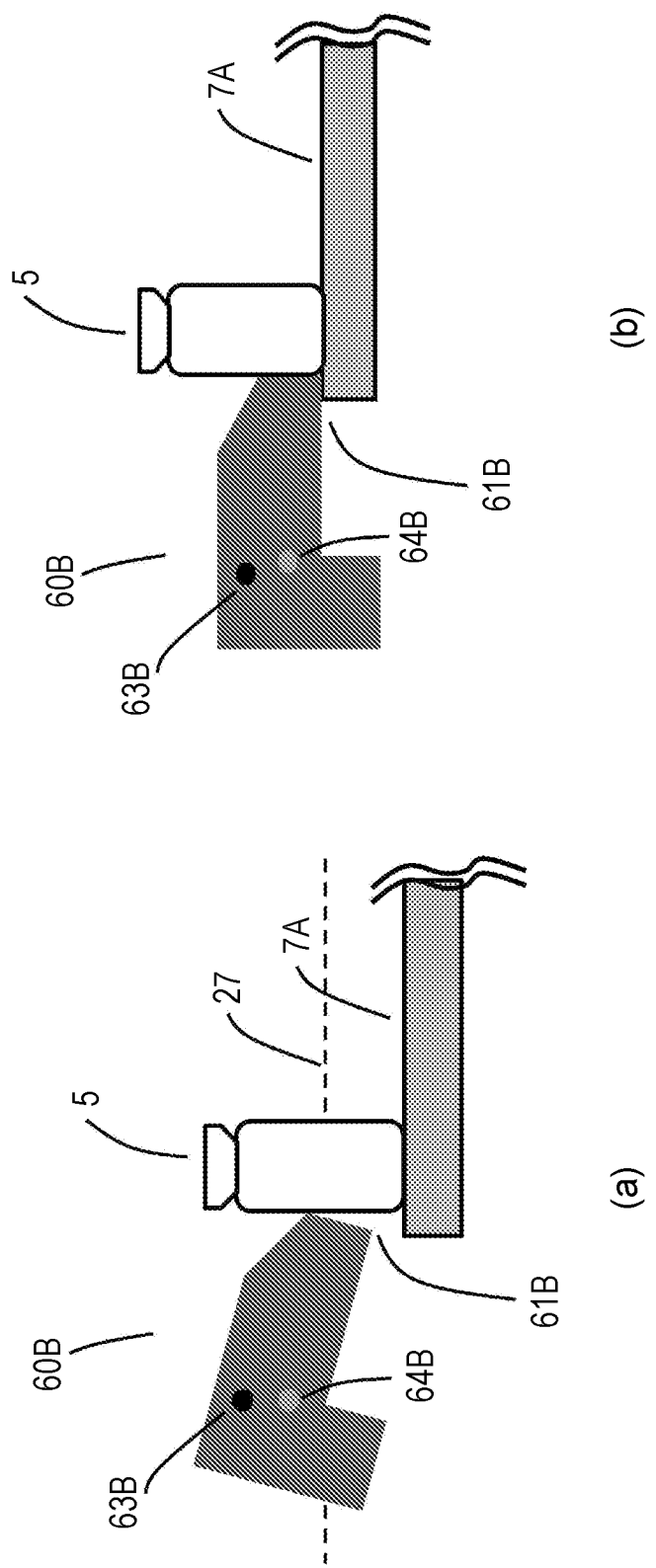
FIG. 16 includes schematic diagrams each illustrating a modification of the guide member in the embodiment.

Alternatively, as illustrated in FIG. 16(a), while the plate is not disposed at the loading/unloading position, the guide member 60B may be balanced such that the contact portion 61B faces downward relative to a plane 27 on which an upper surface of the plate disposed at the loading/unloading position is located. In this case, as illustrated in FIG. 16(b), when the plate is disposed at the loading/unloading position, the contact portion 61B of the guide member 60B contacts the plate. The gravity causes the guide member 60B to exert a force on the plate, thus stabilizing the guide member 60B. For this reason, the guide member 60B hardly moves if a moment of force is generated in response to contact between the guide member 60B and the articles 5. Furthermore, a moment generated by a force applied to the guide member 60B from the articles 5 presses the guide member 60B against the plate, thus preventing the guide member 60B from being rotated accidentally. This stabilizes the posture of the guide member 60B.

Figure 17:
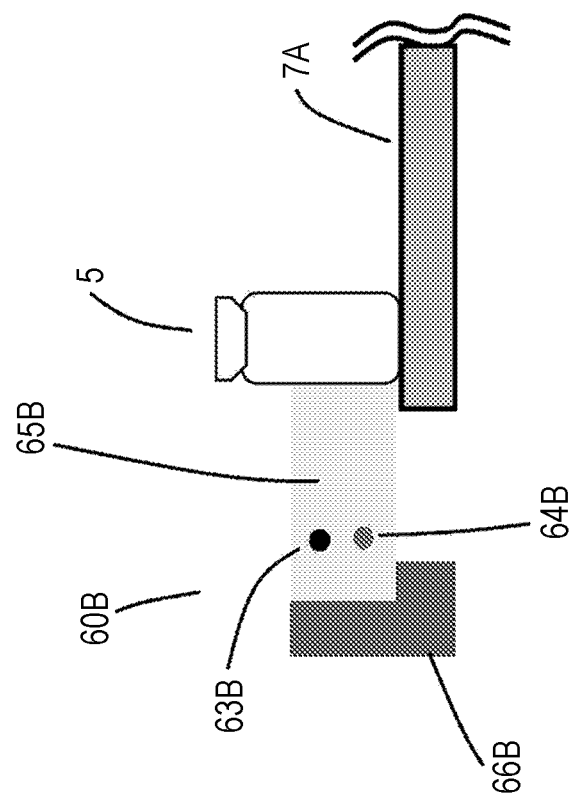
FIG. 17 is a schematic diagram illustrating a modification of the guide member in the embodiment.

As illustrated in FIG. 17, the guide member 60B may include a first material portion 65B made of a first material and a second material portion 66B made of a second material. The first material portion 65B is located adjacent to the plate and the second material portion 66B is located on a side of the rotation axis remote from the plate. For example, the first material has a lighter specific gravity than the second material. The first material is, for example, resin. The second material is, for example, metal. The gravity center of the guide member 60B can be designed at any position by appropriately setting the ratio of the first material portion 65B to the second material portion 66B without changing the overall shape of the guide member 60B. The above description of the guide member 60B applies to the guide member 60A.

The rotary shafts of the guide members 60A and 60B in FIG. 1 may be held by fastening members included in the article transfer device. The fastening members included in the article transfer device are, for example, the guide rails for the transfer units 3A and 3B.

In the above-described enclosure according to the embodiment, when the articles 5 illustrated in FIG. 1 are loaded onto or unloaded from the plate disposed at the loading/unloading position, the guide members 60A and 60B guide the movement of the articles 5 so that the articles 5 can be prevented from falling off the opposite sides of the plate. In addition, the guide members 60A and 60B enable the articles 5 to be inwardly arranged at the predetermined distance from each of the opposite sides of the plate. The guide members 60A and 60B each have the rotation axis located outside the opposite sides of the plates 7A to 7D. When the guide members 60A and 60B contact the upper surface or the lower surface of any one of the plates 7A to 7D, the guide members 60A and 60B rotate with vertical movement of the one of the plates 7A to 7D. Therefore, the guide members 60A and 60B do not interfere with vertical movement of the plates 7A to 7D.

Furthermore, a drive unit, such as an actuator, for retracting the guide members 60A and 60B before vertical movement of the plates 7A to 7D can be eliminated in the furnace 1. Consequently, dust that may be generated from the drive unit can be prevented from being scattered in the furnace 1. In addition, guide members fixed to each of the plates can interfere with distribution of a cleaning liquid and may form many dead corners that the cleaning liquid cannot reach during cleaning of the inside of the furnace 1. In contrast, the enclosure according to the embodiment includes the pair of guide members 60A and 60B for the plates 7A to 7D. This configuration facilitates cleaning of the inside of the furnace 1.

Other Embodiments

While the embodiment of the present invention has been described above, the description and the drawings constituting parts of this disclosure should not be construed as limiting the present invention. From this disclosure, various alternative embodiments, examples, and applications will be apparent to those skilled in the art. For example, the articles to be loaded into or unloaded from the furnace are not limited to those containing medicine. Examples of the articles include food products, beverage products, precision parts, and any other articles. The furnace is not limited to the freeze-drying furnace. Examples of the furnace include a fermentation furnace and any furnace that is required to reduce or eliminate an uneven internal temperature distribution as well as dust generation. In addition, the transfer units 3A and 3B may be driven by any means other than the magnetic screws. As described above, it should be understood that the present invention encompasses various additional embodiments that are not described herein.

REFERENCE SIGNS LIST 1 furnace
2A, 2B transmission unit
3A, 3B transfer unit
5 article
6 contact member
7A, 7B, 7C, 7D plate
9 external bridge
10 bellows cover
11 door
17A, 17B, 17C hook
27 plane
30 stationary plate
40 conveyor
41 shifter
60A, 60B guide member
61A, 61B contact portion
63B rotation axis
64B gravity center
65B first material portion
66B second material portion
100 sterilizer

The invention claimed is:

1. An enclosure comprising:
a furnace;
a plurality of plates arranged in the furnace, the plates being used for placement of an article, each of the plates being movable vertically in the furnace; and
a guide member disposed adjacent to a side of one plate of the plates that is disposed at a loading/unloading position where the article is allowed to be loaded into or unloaded from the furnace, the guide member guiding the article and being rotatable with vertical movement of the plate.

2. The enclosure according to claim 1,
wherein the guide member includes a contact portion capable of contacting the plate, and
wherein as the plate moves vertically, the plate contacts the contact portion and the guide member rotates.

3. The enclosure according to claim 2, wherein the plate disposed at the loading/unloading position contacts the guide member to prevent the guide member from rotating, thereby stabilizing the posture of the guide member.

4. The enclosure according to claim 2, further comprising:
an external bridge disposed outside a door of the furnace; and
an article transfer device configured to move the article on the external bridge and the plate,
wherein the article transfer device includes a transfer unit that transfers the article in response to receiving a force and a transmission unit that is disposed on the external bridge and in the furnace and transmits a force to the transfer unit.

5. The enclosure according to claim 1, wherein the guide member rotates about an axis located outside the side of the plate.

6. The enclosure according to claim 5, wherein the guide member has a center of gravity located below the axis of rotation.

7. The enclosure according to claim 1, wherein the plate disposed at the loading/unloading position contacts the guide member to prevent the guide member from rotating, thereby stabilizing the posture of the guide member.

8. The enclosure according to claim 1, further comprising:
an external bridge disposed outside a door of the furnace; and
an article transfer device configured to move the article on the external bridge and the plate,
wherein the article transfer device includes a transfer unit that transfers the article in response to receiving a force and a transmission unit that is disposed on the external bridge and in the furnace and transmits a force to the transfer unit.

9. The enclosure according to claim 8, wherein the guide member includes a rotary shaft held by a fastening member included in the article transfer device.

10. The enclosure according to claim 1, further comprising:
   a sterilizer that sterilizes the inside of the furnace.

11. The enclosure according to claim 1, wherein the furnace is a freeze-drying furnace.

* * * * *